United States Patent [19]

Proctor et al.

[11] Patent Number: 5,208,077

[45] Date of Patent: May 4, 1993

[54] METHOD FOR A COMPOSITE MATERIAL COMPRISING COATED AND FILLED METAL STRAND FOR USE IN PRESTRESSED CONCRETE, STAY CABLES FOR CABLE-STAYED BRIDGES AND OTHER USES

[75] Inventors: Dale D. Proctor; Denny M. Bucy, both of Orange Park; R. Terry Johnson, Macclenny, all of Fla.; Michael R. Bradley, St. George, Ga.

[73] Assignee: Florida Wire and Cable Company, Jacksonville, Fla.

[21] Appl. No.: 610,225

[22] Filed: Nov. 9, 1990

[51] Int. Cl.$^5$ .............................................. B05D 1/06
[52] U.S. Cl. .................................... 427/461; 427/318; 427/398.3; 427/482; 427/486; 118/634; 14/22; 52/223.14; 428/379; 428/396; 57/1 UN
[58] Field of Search .................... 427/29, 32, 185, 195, 427/318, 398.3, 459, 461, 482, 486; 118/634, DIG. 5; 52/722, 230; 428/375, 377, 379, 396; 156/166, 180, 441; 264/136, 137; 57/221, 223, 232, 241, 242, 258, 7, 1 UN; 14/22, 23

[56] References Cited

U.S. PATENT DOCUMENTS

| | | | |
|---|---|---|---|
| 3,060,640 | 10/1962 | Harris | 52/230 |
| 3,425,207 | 2/1969 | Campbell | 57/7 |
| 4,192,057 | 3/1980 | Borelly | 57/7 |
| 4,205,515 | 6/1980 | Garner | 427/185 |
| 4,606,183 | 8/1986 | Riggs | 57/221 |
| 4,718,965 | 1/1988 | Finsterwalder et al. | 52/230 |
| 4,916,012 | 4/1990 | Sawanobori et al. | 428/379 |
| 5,057,338 | 10/1991 | Baucom et al. | 427/195 |

FOREIGN PATENT DOCUMENTS

| | | | |
|---|---|---|---|
| 110542 | 6/1984 | European Pat. Off. | 427/32 |
| 63-4160 | 1/1988 | Japan | 428/377 |
| 1135491 | 12/1968 | United Kingdom | 52/230 |

Primary Examiner—Michael Lusign
Assistant Examiner—Terry J. Owens
Attorney, Agent, or Firm—William R. Hinds

[57] ABSTRACT

A composite material, particularly useful for prestressing concrete and in stay cables for cable-stayed bridges and other such uses where strength, corrosion resistance and resistance to fatigue failure are particularly important, comprises high strength wire strand coated and impregnated with an impermeable and strongly adherent epoxy based resin. The impregnated and coated epoxy increases the flexural stiffness of the composite against bending fatigue in the areas of the anchorages in dynamically loaded situations and reduces relative movement and rubbing of the wires of the strand so as to reduce fretting and hence fretting fatigue, the principal mechanism for failure in dynamically loaded strand. Impregnation and coating are effected by passing the fully formed and heated strand through a known electrostatic powder coating line, modified to include a mechanism for temporarily opening successive sections of the strand such that the strand passes into the coater in an opened state, and the strand wires are coated with a fused thermosetting epoxy resin before the strand is permitted to reclose, the resin filling the interstices in the reclosed strand. The strand opening mechanism includes a rotatable template with wire guides for leading the outer spiraled wires temporarily away from the center wire, and can be used in any method where a formed strand or similar member needs to be opened for coating or otherwise surface treating the interior wire surfaces in a continuous process.

4 Claims, 2 Drawing Sheets

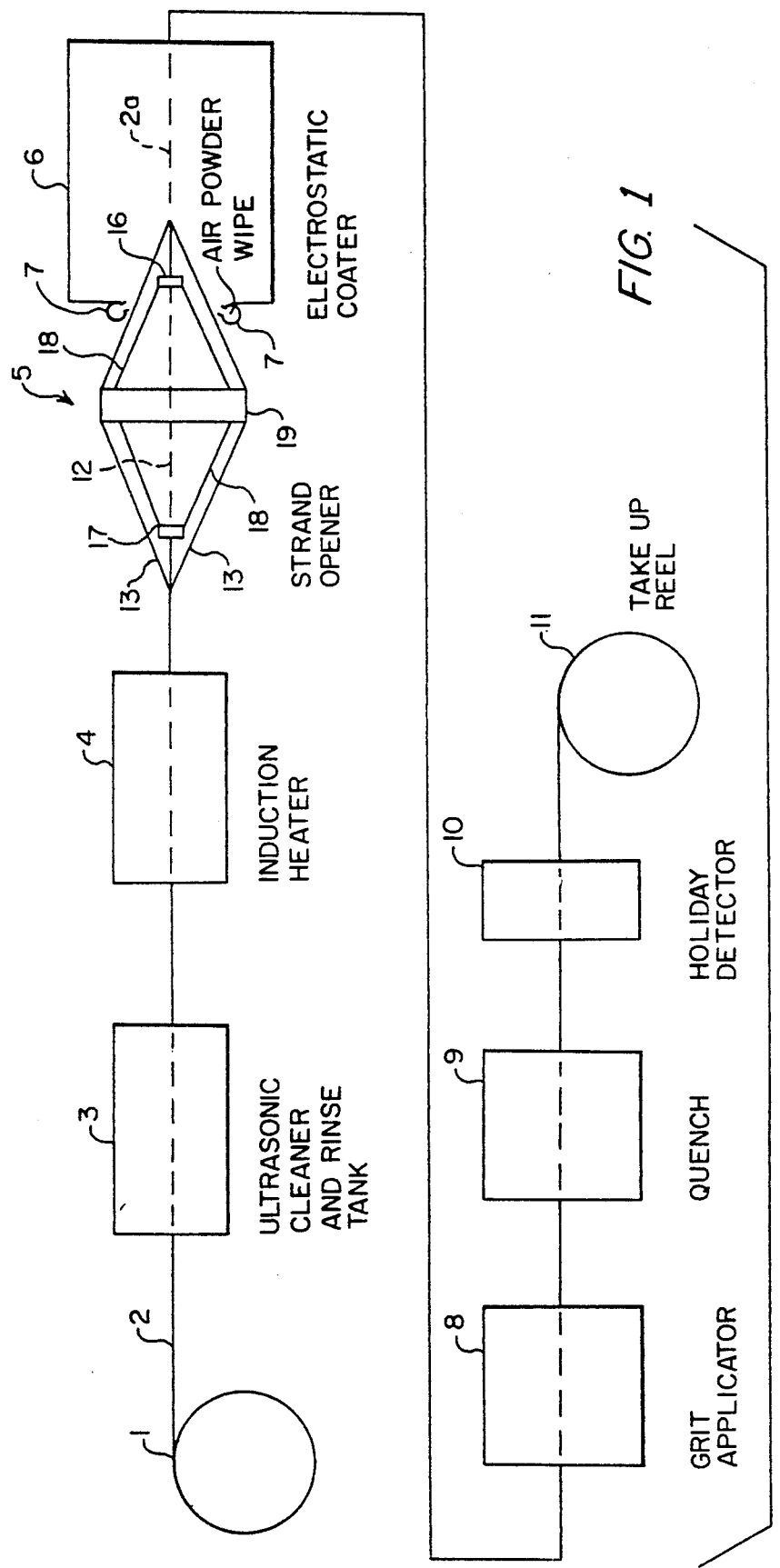

AIR IN 5,208,077

METHOD FOR A COMPOSITE MATERIAL COMPRISING COATED AND FILLED METAL STRAND FOR USE IN PRESTRESSED CONCRETE, STAY CABLES FOR CABLE-STAYED BRIDGES AND OTHER USES

FIELD OF THE INVENTION

This invention relates to composite materials particularly useful for prestressing concrete, by either pretensioning or posttensioning, and in stay cables for cable-stayed bridges and other such uses where strength, corrosion resistance and resistance to fatigue failure are particularly important, the composite material comprising high strength wire strand coated and impregnated with an impermeable and strongly adherent epoxy based resin which provides protection against corrosion and increases the flexural stiffness of the composite and reduces relative movement and rubbing of the wires of the strand so as to reduce fretting and hence fretting fatigue. The invention also relates to a method of making such a composite material involving a new technique for impregnating the interstices of the strand and coating the strand with the epoxy based resin. This technique is also considered applicable to any method involving treating the interior of a stranded member while continuously advancing the stranded member.

BACKGROUND

Two of the most serious problems in the use of steel strand in prestressing concrete and in stay cables for cable-stayed bridges are corrosion and fatigue, and both have received substantial attention in the art. The corrosion problem needs no explanation, and varies greatly with the environment of the location. Fatigue is the tendency of a material to fail after a large number of repeated loadings at a stress level that would not cause failure for static loading. The mechanism of fatigue is the gradual growth of a crack under the influence of fluctuating stresses until a critical depth is reached and brittle fracture occurs. Any condition leading to a stress concentration can act as a crack initiator, such as material flaws, welds, or surface damage. Bending fatigue, which may be considered as a form of work hardening, can occur at the anchorages of the stay cables of cable-stayed bridges where repetitive bending of the stay cable strand may ultimately cause bending fatigue failure. Fretting fatigue arises from a rubbing action, whether rubbing of strands against each other, or strand against the surrounding duct in posttensioned prestressed concrete, or rubbing of the wires of a strand against each other. For instance, when individual strands or wires slip relative to each other or relative to the duct, this slip, which may be minute, can cause severe abrasions, and increases stresses between the contacting elements which can initiate surface cracks that will propagate under cyclic loading. The problem of metal on metal rubbing under the influence of lateral and fluctuating axial stresses is known as "fretting," and studies have shown that extremely small slip amplitudes such as those that occur between individual wires of a strand, or parallel bundled wires can have a significant impact on the fatigue behavior. This is set out in a published research report by G. P. Wollmann et al entitled "Fretting Fatigue in Post-tensioned Concrete" dated November, 1988, report No. FHWA/TX-90+465-2F, involving research performed by the Center for Transportation Research, Bureau of Engineering Research, The University of Texas at Austin, Austin, Tex., in cooperation with the U.S. Department of Transportation, Federal Highway Administration, and obtainable from National Technical Information Service, Springfield, Va.

A significant advance in the art of corrosion protection, particularly for concrete prestressing strand, occurred with the introduction in late 1982 of epoxy coated strand, which is now well-known and which has been commercially available since about late 1982 or early 1983, and is described in commonly assigned European patent No. 0110542 of Oct. 21, 1983, and in an article entitled "Epoxy Coated Seven-Wire Strand for Prestressed Concrete" appearing in the *Journal of the Prestressed Concrete Institute*, Volume 29, No. 4, July-August, 1984. The Wollmann et al report mentioned above confirmed also that the epoxy coating improved the fatigue performance of the strand as used in posttensioning strands as involved in the study. Since its introduction, the epoxy coated strand has been used fairly widely in both pretensioned and posttensioned prestressed concrete, and has been used in the stay cables of a major cable-stayed bridge across the Mississippi River at Quincy, Ill., USA, as described in an article captioned "Cable-Stay Bridge to Span Mississippi River" appearing in the November, 1986, issue of *Roads & Bridges Magazine*. It will be understood, of course, that, unlike a suspension bridge, which supports the deck from vertical cables, a cable-stayed bridge is borne on cables hung at angles from tall towers, for example, as schematically illustrated in FIG. 1 of Jungwirth et al U.S. Pat. No. 4,633,540 and as shown in the above mentioned article in *Roads & Bridges Magazine*.

The present invention involves a modification of the known epoxy coated strand which will be beneficial under certain circumstances, the modification involving filling of the internal voids or interstices with the epoxy based resin such that any corrosive media which might penetrate the epoxy coating will be prohibited from migrating through the voids or interstices between and along the wires. At the same time, this achieves the additional benefit of resisting relative movement of the wires of the strand, thus increasing the flexural stiffness of the coated and impregnated strand so that it acts in the manner of an integral composite material, and increases the resistance to fretting fatigue. As a still further benefit, the impregnated and coated strand can be made by a new technique involving relatively minor modification of known production lines for making the known epoxy coated strand. We also consider the new technique to be superior to previously proposed techniques for impregnating wire rope, strand or the like.

Prior proposals for impregnating rope or strand have been set out in Wheeler U.S. Pat. No. 4,635,432 issued Jan. 13, 1987, and Campbell U.S. Pat. No. 3,425,207 issued Apr. 24, 1967. The Wheeler patent describes and enumerates the disadvantages of previous methods for impregnating wire rope with plastic material, most of which appear to have involved extrusion techniques. Wheeler proposed a method of continuously impregnating and encapsulating wire rope with a polymer formed from at least two reactive components which when mixed and heated together react chemically to form a low viscosity liquid intermediate polymer which continues to cure until it becomes a solid. In accordance with Wheeler's method, each component is separately pumped into a mixing unit, and the resulting blended mixture is pumped into an injection die. The mixture does not rapidly react to form the solid polymer since heat sufficient to initiate rapid reaction between the components has not been applied to the mixture. The wire rope is preheated to a temperature sufficient to initiate rapid reaction of the components, and the preheated rope is then introduced into the injection die. As the preheated wire rope passes through the injection die in contact with the mixed components, the components are heated and react upon contact with the wire rope to form the liquid intermediate polymer. The liquid intermediate polymer continuously impregnates the interstitial voids of the wire rope and encapsulates the wire rope as it passes through the die. While the Wheeler method may be workable, it appears unduly complex relative to the technique involved in the present invention. Campbell U.S. Pat. No. 3,425,207 involves a method of forming a wire rope in which adjacent wires are separated by an elastomeric material which fills the interstices between the wires, the method involving drawing through a die a strand formed from a mixture of filamentary components of metal and elastomer. The die is a sizing or compacting die, and the components are subjected to tension, radial pressure and temperature corresponding to the softening point of the elastomer whereby the interstitial spaces between the filamentary components are filled by plastic flow of the elastomer. The patent states that the adjacent wires, in the same layer at least, are not in physical contact with each other but are separated by the elastomeric material, and that there is no adhesion of the steel wires to the elastomer such that they are able to move without hindrance, a feature which is contrary to a feature of the present invention, that is, limiting relative movement of the wires so as to enhance resistance to fretting fatigue.

FEATURES AND ASPECTS OF THE INVENTION

The method of the present invention can be effected via a minor modification of the known production line for known epoxy coated strand as disclosed in previously mentioned European patent No. 0110542. A basic feature of the present method involves the opening and reclosing of the strand at an appropriate point in the electrostatic coating line, and indeed the simplicity and ease with which successive sections of the strand can be temporarily opened and reclosed is rather surprising. In its temporarily opened state, the strand is subjected to the known aerated electrostatically charged cloud of epoxy based resin powder such that the center wire and the outer wires become individually coated, which coating becomes the filler or impregnant for the interstices or voids when the strand is permitted to reclose to its original configuration immediately thereafter. The strand thus becomes completely impregnated and coated, thus enhancing corrosion resistance, while simultaneously resisting relative movement of the wires and increasing the flexural stiffness to reduce fretting fatigue as well as bending fatigue. Indeed, theoretical calculations indicate that the flexural moment of inertia of the impregnated and coated strand relative to bare strand may be increased by a factor up to about 7 or so.

Generally in accordance with the invention, conventional fully formed strand is opened by an opening device just prior to introduction into the coating chamber, and the strand is allowed to close as it proceeds through the coating chamber, effectively entrapping epoxy in the voids between the wires. The opening device is placed just after the known induction heating coil at the entrance to the coating chamber. The opening device in its presently preferred form comprises a rotatable template, through which the individual wires of, for example, a seven wire strand have been fed, with guiding cones or tips at the entrance for the center wire and the six spiraled outer wires, and at the exit for the center wire. The center wire passes centrally through the template, and the outer wires travel through guides carried by the template outwardly of and about the center wire. The template is rotated by the pulling action of the strand as it moves through the line, the rotation arising from the inherent spiral configuration of the outer wires of the strand. The placement of the opening device is such that it introduces the strand into the coating chamber at a location that will allow the electrostatically charged particles of epoxy powder to cling to the exposed center wire as well as the fully exposed outer wires. The strand then closes to its original tight configuration as the epoxy powder melts and fuses on the heated wires, forcing any excess melted epoxy out through the closing wires. This also provides for a more consistent filling of the "valleys" on the outside of the spiraled strand with less overall coating thickness than in the known coating method. Coating of the outer surfaces of the strand continues until the strand leaves the electrostatic coating chamber. Apart from the addition of the opening device, it is advantageous also to provide an adjustable air curtain at the entry to the electrostatic coater such that the air curtain can be adjusted to control the point at which the opened strand is exposed to the aerated powder cloud, and also to prevent buildup of epoxy powder on that part of the opening device which extends into the coating chamber.

Apart from the initial threading of the wires through the opening device and rejoining the outer spiraled wires with the center wire downstream of the opening device to reform the strand, the production line operates essentially in the same manner as during the production of the known coated strand, and the same line can be used for producing both forms of strand by incorporating or removing the strand opening device, as the case may be. Also, as already known for the epoxy coated strand, the impregnated and coated strand may have embedded in the epoxy coating abrasive or gripform particles to provide improved bond with concrete or grout, the abrasive being optionally applied as in the known coated strand.

Other features, aspects, advantages and benefits and uses of the invention will become apparent to those skilled in the art from the ensuing description of preferred embodiments, taken in conjunction with the appended drawings.

BRIEF DESCRIPTION OF THE DRAWINGS

FIG. 1 is a diagrammatic illustration of a production line for use in the invention, being substantially identical to the known production line for epoxy coating strand apart from the incorporation of the illustrated strand opener and air powder wipe or adjustable air curtain;

FIG. 2 is a cross section of a seven-wire strand in accordance with the invention;

DESCRIPTION OF PREFERRED EMBODIMENTS

Referring to the production line schematically illustrated in FIG. 1, a reel of conventional steel wire strand is shown at 1, from which the strand 2 is unwound and passed through the successive stations of the production line. The description of the production line and the method as set forth in European patent 0110542 is applicable. The method generally involves the sequential steps of cleaning the strand, heating the strand to a predetermined temperature, opening the strand, electrostatically coating in a fluidized bed, effecting closure of the strand, optional grit application during the gel phase of the coating heated by the heated strand, and quenching at a desired stage of curing of the coating. As shown, the process line can include a known holiday detector, e.g. a sixty-seven one-half volt D.C. holiday detector. An adjustable drag may be applied to the pay-out reel 1 so that the strand can be appropriately tensioned during movement through the production line.

The cleaning step preferably is accomplished by passing the strand from the pay-out reel 1 through a known ultrasonic cleaner and a rinse tank indicated at 3. This is a known manner of cleaning using well-known equipment. Abrasive blasting is unnecessary.

From the cleaner and rinse tank, the strand passes through an induction heater 4 where it is heated to a temperature determined by, inter alia, the fusion and curing characteristics of the resin to be coated. Typically the strand is heated to between 350° F. and 550° F., more usually 450° F. to 550° F., so as to be at an appropriate temperature when contacted by the resin powder. This is fairly easily determined by observing the coated strand as it initially exits from the coater at the beginning of a run, and subsequent runs using the same resin powder use substantially the same temperatures.

Figure 5:
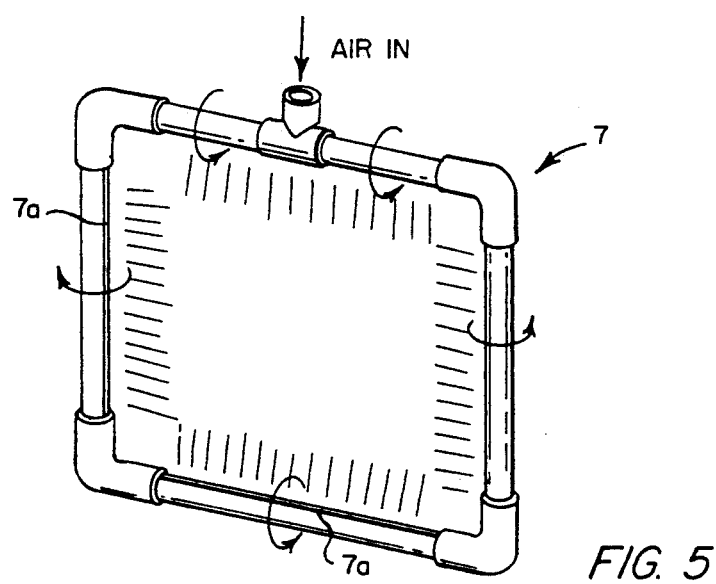
FIG. 5 is a perspective view of an exemplary form of air powder wipe or adjustable air curtain for mounting at the entrance to the electrostatic coater to control the aerated powder cloud where the strand opener structure and the opened strand pass into the coater, the air curtain also assisting in preventing the powder cloud from escaping through the coater entrance and keeping it away from the strand opener structure.

In the known production of coated strand, the heated strand is passed directly to and through the electrostatic coater 6 to be coated by an electrostatically charged cloud of resin powder. This is a known coating technique using commercially available coating equipment. In this coating process, powder particles are aerated in a coating chamber and are electrostatically charged by ionized air. As the powder particles become charged, they repel each other and form a cloud of charged particles. When the grounded strand is conveyed through the cloud, the charged powder particles are attracted to the wire, forming a generally uniform coating, the powder particles being more attracted to exposed areas than to those already insulated. In the modified technique of the present invention, the fully formed and heated strand is passed to a strand opener generally indicated at 5, including a rotatable template 19 provided with wire guides 19a through which the outer spiraled wires 13 pass to be rejoined with the center wire 12 inside the coater 6. The center wire 12 passes freely through the open center of an entry cone 17, the open center of the template 19, and the open center of an exit cone 16. Entry and exit cones 17 and 16 are supported by the rotatable template 19 via mounting rods or the like shown at 18. The fully formed strand 2 is manually opened using simple hand tools, and the center wire 12 and outer wires 13 are threaded through the strand opener as shown, and rejoined downstream of the exit cone 16 where they reform the strand as now impregnated and coated strand indicated at 2a. The outer wires 13 retain and remember their spiraled configuration in passing through the strand opener, and are easily rejoined perfectly with the center wire 12, after which the reformed strand is pulled through the production line in the conventional manner. Surprisingly, once the strand is reformed, it can be pulled through the strand opener fairly easily by hand. An air powder wipe 7 or adjustable air curtain is provided at the entry of the coater 6, being shown in more detail in FIG. 5. The simple embodiment illustrated in FIG. 5 comprises a number of tubes of nonmagnetic, nonconductive material such as PVC tube of one-half inch diameter with elongate air outlet nozzles 7a as shown. Typically, these nozzles 7a may be formed as narrow slots in the tube wall, approximately one-sixteenth inch. The tube sections are joined by conventional elbows and a T connection as shown in FIG. 5, and the connections are not glued such that each tube section is rotatable about its axis relative to the connecting members. Simply by rotating the tube sections appropriately, the air curtain can be directed as desired. The air powder wipe 7 is connected to a supply of pressurized dry clean air via control valves such that the air curtains are fully controllable. A basic purpose of the powder wipe or air curtain is to control the cloud adjacent the coater entrance so as substantially to keep the cloud away from the strand opener structure such as the exit cone 16, and expose the opened strand to the cloud immediately downstream of the exit cone 16. In a presently preferred construction, the exit cone 16 projects into the coater by about four inches to six inches, and the point of reformation or closure of the strand is approximately eleven inches to twelve inches downstream of the exit cone 16. It is over this eleven to twelve inch section that the primary coating of the opened wires of the strand takes place such that impregnation and filling of the interstices is complete when the strand closes.

Figure 3:
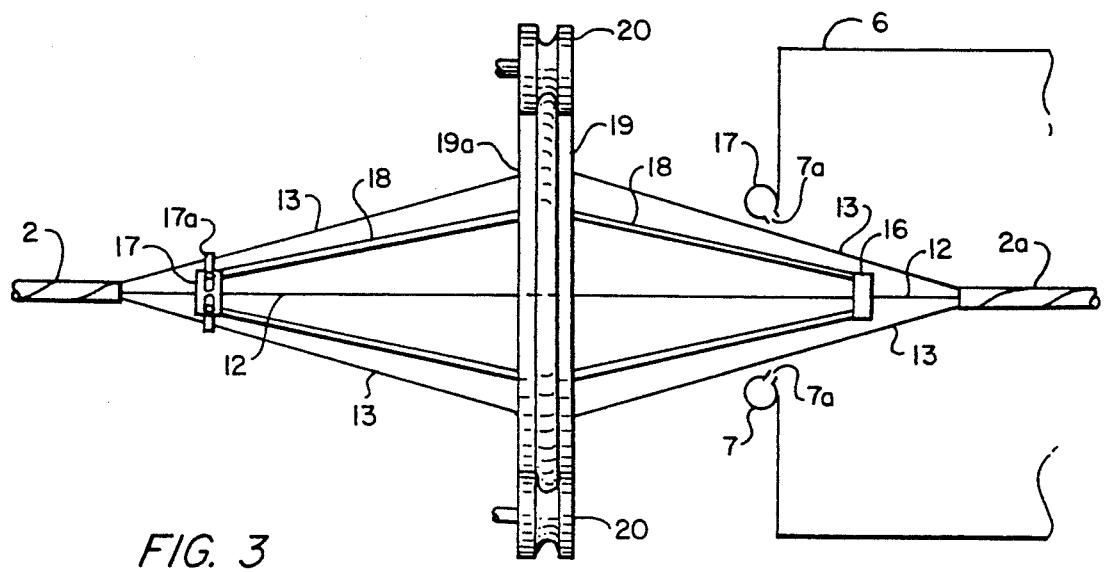
FIG. 3 is a diagrammatic illustration showing the strand as it passes through the strand opener and into the electrostatic coater.
Figure 4:
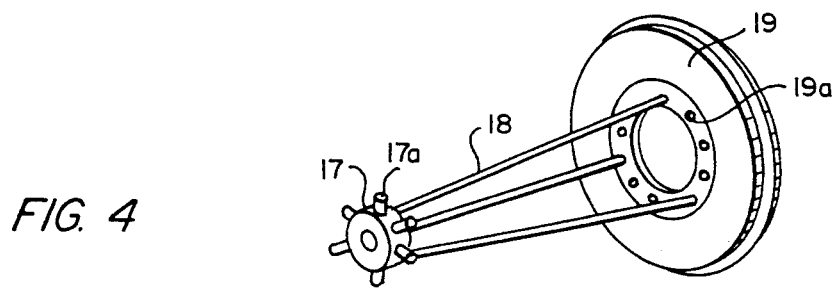
FIG. 4 is a perspective view of the "upstream" side of the strand opener, the "downstream" structure being not shown in FIG. 4, but adequately illustrated in FIG. 3.

As shown in FIGS. 3 and 4, spaced separators 17a are provided on the entry cone 17 to facilitate separating and threading of the outer wires 13 through the wire guides 19a in the rotatable template. The exit cone 16 does not include similar structure, since the outer wires do not contact the exit cone 16, passing instead directly from the wire guides 19a to the point of closure or reformation, as shown in FIG. 3. The primary purpose of the exit cone 16 is to guide the center wire 12. It will be appreciated that the center wire 12 tends to bend or deflect between the opening point and the closing point to compensate for the effective "shortening" of the outer spiraled wires as they follow a longer path than the center wire 12 between the opening and closing points of the strand. This exerts an axial compressive force on the center wire 12, which typically attempts to assume a bowed or S-shaped configuration between the strand opening and closing points. This provides one important reason for the air powder wipe or air curtain in that it is important to prevent powder buildup on the exit cone 16 and the adjacent mounting rods 18 since the center wire variously contacts and heats the exit cone 16, and hence powder buildup on the exit cone 16 would fall off or be pulled off to the detriment of the smooth coating desired on the wires.

As shown in FIG. 3, the rotary template 19 is rotatably supported and axially retained by grooved support rollers 20, cooperating with a mating rounded rail on the periphery of template 19, the rollers 20 being typically spaced at 120° about the rotatable template 19. Thus, the template 19 is free to rotate under the rotary force of the spiraled strand configuration as the outer wires pass through the guides 19a. Of course, the guides 19a and separators 17a will be appropriately spaced and of appropriate numbers for the number of outer wires in the particular strand being processed. The numbers and locations illustrated in FIG. 4 are merely exemplary of their general natures and locations.

Suitable epoxy based resin powders are as disclosed in European patent 0110542 and Hart U.S. Pat. Nos. 4,761,336 and 4,857,362. These are thermosetting powder coatable epoxy based compositions in which the major component is a high epoxide equivalent weight epoxy resin or resins. The high epoxy content is considered necessary to provide the required strength, toughness and adherence to the wire and strand surfaces. As in the earlier epoxy coating technique described in European patent 0110542, it is preferred that the epoxy not be fully cured, but rather that curing be limited to approximately eighty percent to ninety percent of final cure. In the present invention, an outer coating thickness for the strand preferably is between fifteen and forty mils, and the coating applied to the wires of the opened strand should be such as to ensure that the interstices or voids are completely filled by the "squeezed" epoxy when the strand is reclosed, as shown in FIG. 15 where the voids or interstices 15 are shown completely impregnated with the epoxy filler which strongly adheres to the void-defining adjacent wire surfaces, as does the outer coating 14, such that the completed product tends to function as an integral composite. Both the coating and the epoxy impregnant are integrally adherent with the strand upon coiling or bending and during elongation under tension conditions.

Referring back to FIG. 1, the heated strand leaves the powder coater with its epoxy coating in a viscous state, ready to receive the optional grit at grit applicator 8. In general, the grit should be applied as soon as possible after the melted epoxy has flowed sufficiently to close all holidays, but while the viscosity is sufficient to prevent the grit from penetrating to the metal. The grit may be applied by pneumatic spray guns or by being fed onto rotating "flingers" which impact the grid onto the strand coating. The force should be regulated in keeping with the particle sizes and the viscosity condition of the epoxy so as to partially, but firmly, embed the grit in the viscous epoxy, short of contact with the strand, so as to minimize the possibility of creating flow paths for corrosive elements along the interfaces of the grit particles and the epoxy in which they are embedded, such that they will have exposed external surfaces to bond with the concrete or grout, depending on the use of the strand.

The strand, with or without applied grit, is then passed through a quench tank 9 at the desired stage of curing of the epoxy, passes therefrom optionally through a spark tester 10 to detect pin holes or holidays, and thence to the take-up 11.

In general, the strand opener may be configured and dimensioned so as to open the strand to a diameter of about four inches to eight inches, with the opening and closing points being from about eighteen inches to twenty-four inches on each side of the rotating template, such that the open section of strand between the opening and closing points is about three feet to four feet, although these dimensions are not at all critical and may be varied substantially. The strand opener is adjustably mounted such that it can be positioned axially adjustably relative to the powder coater. During the practice of the method, the strand reforms perfectly and continuously downstream of the strand opener once the outer spiraled wires are reclosed about the center wire and a pulling force is applied to the reclosed strand. It will be understood that although the wires are shown straight in the schematic drawings, in practice they retain their gradual spiral configurations as to the outer spiraled wires, and the center wire tends to assume a slight S-shaped configuration between the opening and closing points because of the "shortening" force imposed on it by virtue of the longer paths followed by the outer wires between the opening and closing points.

Having thus described and illustrated preferred embodiments of our invention, we wish it to be understood that these embodiments are exemplary of the invention rather than limiting of it, and that the invention itself is as defined in the subjoined claims taken in the light of the foregoing description and illustrations.

We claim:

1. A method of making a composite material comprising a strand of high strength steel wires, the strand being coated and impregnated with a substantially impermeable and strongly adherent plastic resin, comprising advancing a fully formed strand of high strength steel bare wires from a supply thereof, the strand comprising plural outer wires individually spiraled about a center wire, cleansing the strand as it advances, heating the strand as it advances to a temperature above the fusion temperature of a plastic resin powder to be electrostatically applied thereto in a subsequent stages, temporarily opening successive sections of the strand as it advances by guiding the outer spiraled bare wires individually outwardly at an acute angle from the center wire, and subsequently closing the strand by returning the outer wires to their initial spiral configuration about the center wire, subjecting the successive sections of the advancing strand while in the opened state and after return to the closed state to an electrostatically charged powder of a thermosetting plastic resin which maintaining the strand at a different potential relative to the powder so as to attract the powder the strand and form a coating of the powder thereon which melts and fuses by heat from the strand such that upon closing the strand the resin on the center wire and the relatively inner surfaces of the outer wires impregnates an substantially fills the interstices between the center wire and to the outer wires and other of the resin forms a fused coating on the exterior of the closed strand, permitting the resin filling and coating to at least partially cure under the heat of the strand, quenching the filled and coated strand after the at least partial curing, and continuously taking up the quenched coated strand.

2. The method as claimed is claim 1 wherein at least the major part of said thermosetting resin is epoxy resin, and said electrostatically charged powder comprises an aerated powder cloud.

3. A method as claimed in claim 2, further comprising variable directing from a pressurized air source an air curtain toward the strand and the charged powder cloud such that the air curtain substantially surrounds the still-open-but-closing strand, thereby controlling the area in which the powder cloud is exposed to the strand.

4. A method as claimed in claim 1 wherein successive sections of the strand are temporarily opened and closed by leading the center wire in a generally straight path in the direction of advance, leading the outer spiraled wires through laterally spaced guides located in a rotatable template and spaced radially outwardly from and about the path of the center wire, and returning the outer wires to their original spiraled configurations about the center wire downstream of the rotatable template in the direction of advance.

* * * * *

UNITED STATES PATENT AND TRADEMARK OFFICE
CERTIFICATE OF CORRECTION

PATENT NO. : 5,208,077
DATED : May 4, 1993
INVENTOR(S) : PROCTOR, Dale D, et al

It is certified that error appears in the above-indentified patent and that said Letters Patent is hereby corrected as shown below:

On the title page, Item [54]: Title should read as follows:

--METHOD FOR MAKING A COMPOSITE MATERIAL COMPRISING COATED AND FILLED METAL STRAND FOR USE IN PRESTRESSED CONCRETE, STAY CABLES FOR CABLE-STAYED BRIDGES AND OTHER USES--.

Column 8, line 38, "cleasing" is changed to --cleaing--
         line 41, "stages" is changed to --stage--
         line 50, "which" is changed to --while--
         line 52, after "powder" there is inserted --to--
         line 56, "an" is changed to --and--
         line 58, "to" is deleted Column 9, line 2, "variable" is changed to --variably--

Signed and Sealed this

Twenty-ninth Day of March, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,208,077
DATED : May 4, 1993
INVENTOR(S) : Dale D. Proctor, et al

It is certified that error appears in the above—identified patent and that said Letters Patent is hereby corrected as shown below:

On the title page, Item [54]: Title should read as follows:

--METHOD FOR MAKING A COMPOSITE MATERIAL COMPRISING COATED AND FILLED METAL STRAND FOR USE IN PRESTRESSED CONCRETE, STAY CABLES FOR CABLE-STAYED BRIDGES AND OTHER USES--.

Column 8, line 38, "cleansing" is changed to --cleaning--
line 41, "stages" is changed to --stage--
line 50, "which" is changed to --while--
line 52, after "powder" there is inserted --to--
line 56, "an" is changed to --and--
line 58, "to" is deleted Column 9, line 2, "variable" is changed to --variably--

This certificate supersedes Certificate of Correction issued March 29, 1994.

Signed and Sealed this

Fourteenth Day of June, 1994

Attest:

BRUCE LEHMAN

Attesting Officer

Commissioner of Patents and Trademarks